UNITED STATES PATENT OFFICE.

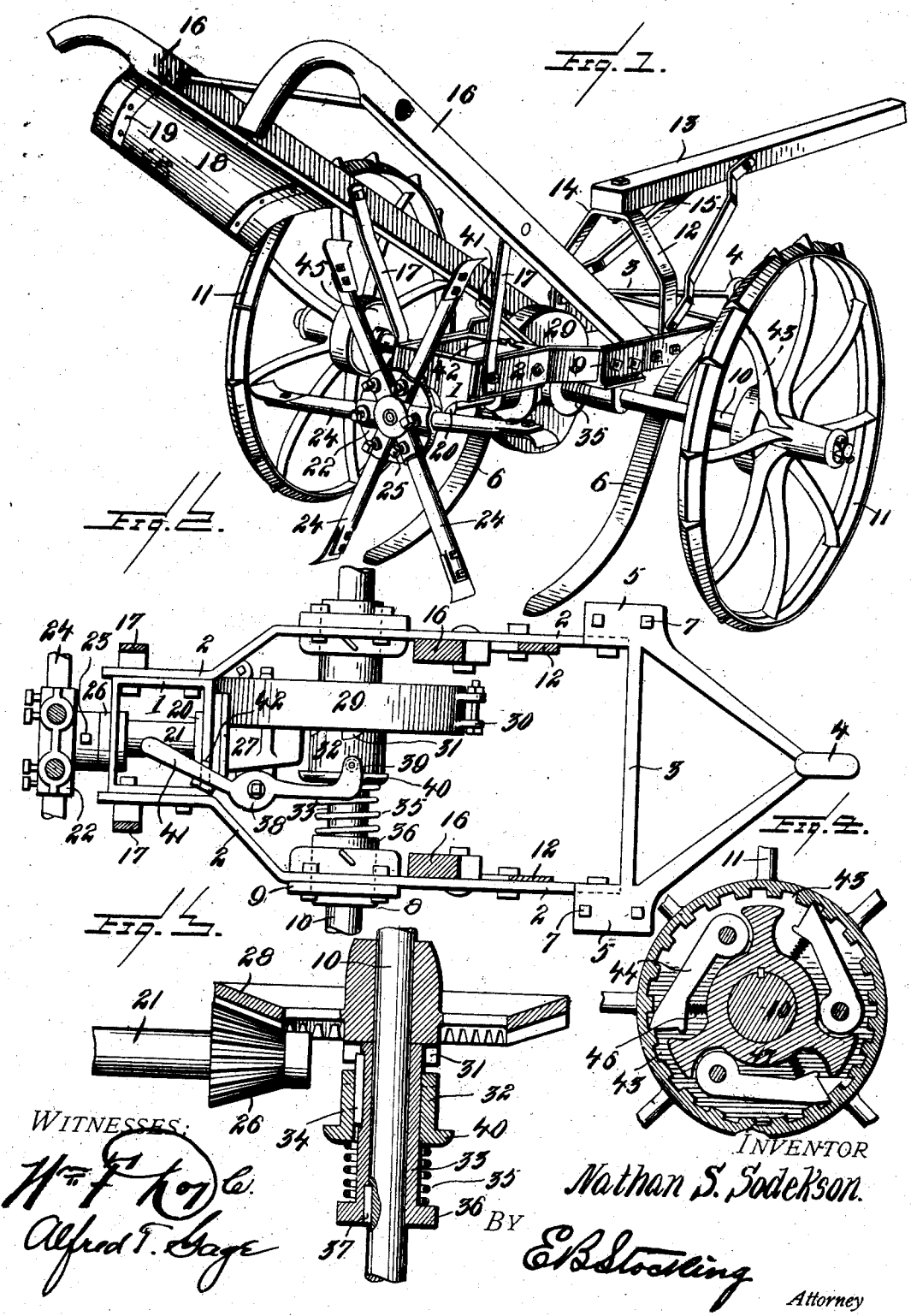

NATHAN S. SODEKSON, OF MINEOLA, TEXAS, ASSIGNOR OF ONE-THIRD TO SARA R. McCAMISH, ONE-THIRD TO LENA R. BEAIRD, AND ONE-THIRD TO EVA M. SODEKSON, ALL OF MINEOLA, TEXAS.

COTTON-CHOPPER.

No. 874,129.   Specification of Letters Patent.   Patented Dec. 17, 1907.

Application filed May 6, 1907. Serial No. 372,152.

*To all whom it may concern:*

Be it known that I, NATHAN S. SODEKSON, citizen of the United States, residing at Mineola, county of Wood, and State of Texas, have invented certain new and useful Improvements in Cotton-Choppers, of which the following is a specification, reference being had therein to the accompanying drawing.

This invention relates to a cotton chopper, and particularly to a machine of that character embodying rotary choppers operating at an angle to the path of travel of the machine.

The invention has for an object to provide a novel and improved construction of the machine frame for supporting and driving the chopper blades through power secured from the main axle together with a clutch device by which the driving of the blades may be discontinued and the machine thus readily transported.

Other and further objects and advantages of the invention will be hereinafter set forth and the novel features thereof defined by the appended claims.

In the drawing:—Figure 1 is a perspective of the invention; Fig. 2 is a plan of the machine frame with parts in section; Fig. 3 is an enlarged horizontal section through the driving shaft and clutch thereon, and Fig. 4 is an enlarged vertical section through one of the wheel hubs showing the driving pawls therein.

Like numerals refer to like parts in the several views of the drawing.

The numeral 1 designates a rectangular frame or casting to the opposite sides of which the side bars 2 are secured and extend forward where they are joined by the triangular draft frame 3 having the clevis connection 4 at its apex. This draft frame is provided at opposite sides with the attaching plates 5 to which the supporting springs 6 extending downwardly and rearwardly therefrom are attached by means of the bolts 7, or in any other desired manner. At substantially the midlength of the side pieces 2 bearing boxes 8 are secured by means of the integral connecting plates 9 carried thereby and formed as an angular plate embracing the side bars and secured thereto in any desired manner. These boxes carry the driving shaft 10 which at its opposite ends is provided with wheels 11 of any desired character and preferably having upon their rim traction devices, as shown. At the front of the machine a yoke standard 12 is secured to the opposite sides and carries the draft pole 13 upon the flattened top 14 of the standard, while this pole is suitably braced by the strap 15 extending therefrom to the lower portion of the standard 12. Guiding handles 16 of usual construction are secured to the side bars at their lower end and braced by means of the upright strips 17 extending upward from the sides of the machine frame 1. In order to protect the user of the machine from flying dirt the fender 18, preferably curved, is supported by arms 19 at one side of one of the handles and in the direction of the upward travel of the chopper blades. The frame 1 is provided at opposite ends with bearing boxes 20 in which the chopper shaft 21 is mounted, this shaft being provided at its outer end with a recessed head 22 and secured to said shaft by the set screw 23, or any other desired means. The chopper blades and arms 24 are disposed in these sockets and secured therein in the usual manner, for instance, by set screws 25. Any desired character of arm or blade may be used in connection with this head dependent upon the character of work to be performed.

The shaft 21 is provided with the bevel driving pinion 26, as shown in Fig. 3, which is inclosed in the protecting casing 27, Fig. 2. This pinion meshes with the bevel gear 28, loosely mounted upon the wheel shaft 10, as shown in Fig. 3 and inclosed within the casing 29 which is formed in two parts pivotally connected, as at 30 so that access can be readily had to the gear therein. This gear is provided at one side with a clutch face 31 adapted to coöperate with the sliding clutch member 32 which is mounted upon the sleeve 33 and held against rotation thereon by a spline 34. The clutch member 32 is normally forced into engaging contact with the gear member by the spring 35 extending between the member 32 and the head 36 of the sleeve 33. This sleeve is keyed to the wheel shaft, as shown at 37. The clutch may be withdrawn from engaging contact to prevent rotation of the chopper blades by means of the lever 38 pivotally mounted upon a fixed part of the machine and provided at its end 39 with an engaging projection extending into contact with the flange 40 of the clutch member 32. The opposite end of the lever is provided with a handle 41 which may be retained in its unlocked position by engagement with a seat 42 formed upon the upper edge of the frame 1. By this means the clutch may be held out of contact in the transportation of the machine.

The wheel shaft 10 is driven in the rotation of the wheels 11 in one direction by means of a series of ratchet teeth 43 carried by the hub of the wheel and adapted to engage the pawls 44 pivotally mounted upon the plate 45 secured to the shaft and normally forced outward into contact with the ratchet teeth by the springs 46 disposed between the pawls and the hub 47 of the plate 45 carried by the axle.

In the operation of the invention it will be seen that in the forward rotation of the carrier wheels the shaft will be driven by the pawl connection continuously, and when the clutch is in engagement, as shown in Fig. 2, the chopper blades will be rotated to perform the usual chopping action. This rotation of the blades may be stopped at any time by simply shifting the clutch lever to disengage the driving shaft from the bevel gear thereon thus permitting the transportation of the machine from place to place without the operation of the chopper. The pawl driving connection between the wheels permits a backward or reverse movement of the machine without actuating or influencing the chopper blades which is important in turning or shifting the position of the machine in the field.

The construction of the frame embodies the greatest simplicity with the utmost strength and rigidity, while the rearwardly extending springs support the front of the machine and maintain the general level of the frame and consequent even operation and depth of cut of the chopper blades. The construction and arrangement of fender provides a protection for the operator from dirt thrown upward by these blades in their rotation, while the gears are fully inclosed and protected against dirt or grit which would affect their operation and render the movement of the parts more difficult.

Having described my invention and set forth its merits, what I claim and desire to secure by Letters Patent is:—

1. In a cotton chopper, a rectangular frame provided with shaft bearings, forwardly extending side bars secured to the side faces of said frame, an independent triangular draft frame rigidly secured to the forward ends of said bars and provided with an integral cross bar connecting the side bars, angle irons in which the side bars are seated provided with depending bearings a driving axle mounted in said bearings, and a chopper shaft mounted in the frame and driven from said axle.

2. In a cotton chopper a frame provided with shaft bearings, forwardly extending side bars secured to said frame, a draft frame provided with a cross bar connecting the front ends of the side bars, a driving axle mounted upon said bars, a chopper shaft mounted in the frame and driven from said axle, attaching plates carried by the draft frame at the front of said bars and extended outwardly therefrom, and supporting springs secured to said plates and extending downwardly and rearwardly therefrom.

3. In a cotton chopper, a rectangular frame provided with shaft bearings, forwardly extending side bars secured to said frame, a draft frame provided with a cross bar connecting the front ends of the side bars, irons secured to the side bars and provided with depending bearings, a driving axle mounted in said bearings, a chopper shaft mounted in the frame and driven from said axle, outwardly extending attaching plates carried by the draft frame, supporting springs extending downwardly and rearwardly from said plates, rearwardly extended handles connected to said side bars, a yoke extended upward between the side bars, and a draft pole secured to the upper portion of said yoke.

4. In a cotton chopper, a supporting frame having bearings and forwardly extending side bars, an axle mounted upon said bars, driving wheels upon said axle, a chopper shaft carried by the frame and provided with chopping blades and driving gear, a loosely mounted driving gear upon said axle and having a clutch member, a clutch member mounted upon said axle to coöperate with said gear clutch member, and a protecting casing surrounding the chopper shaft gear and driving gear and having a pivoted cover portion.

5. In a cotton chopper, a frame, a driving shaft mounted thereon, a chopper shaft at an angle to the driving shaft and provided with a head, chopper blades carried by said head, rearwardly extending handles carried by said frame, and a fender extending laterally at one side of one of said handles.

In testimony whereof I affix my signature in presence of two witnesses.

NATHAN S. SODEKSON.

Witnesses:
E. W. McCamish,
A. D. Beaird.